Oct. 20, 1936.    B. B. KAHN    2,057,780
STOVE
Filed March 24, 1933    2 Sheets-Sheet 1
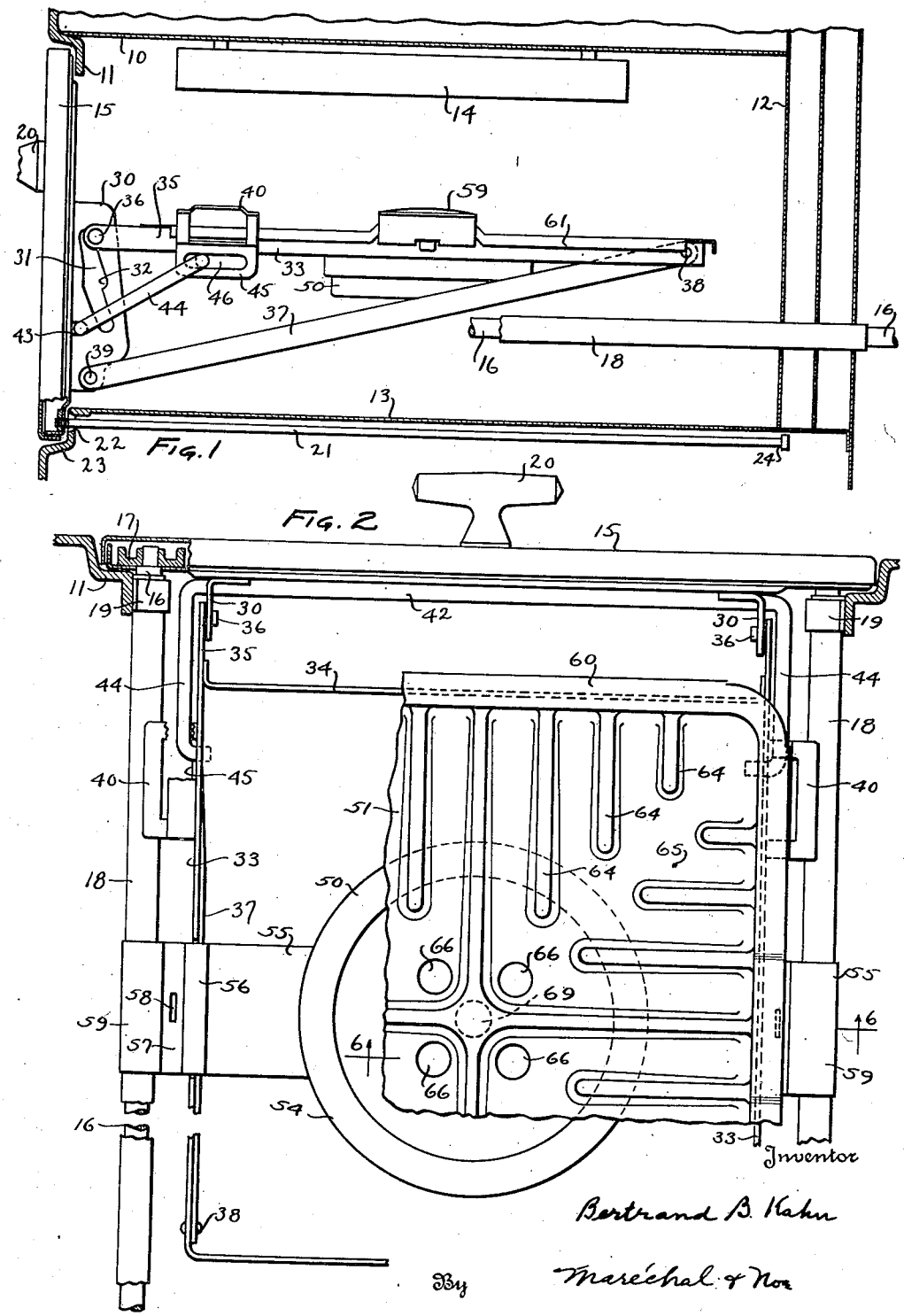

Oct. 20, 1936.                B. B. KAHN                2,057,780
                               STOVE
                        Filed March 24, 1933           2 Sheets-Sheet 2
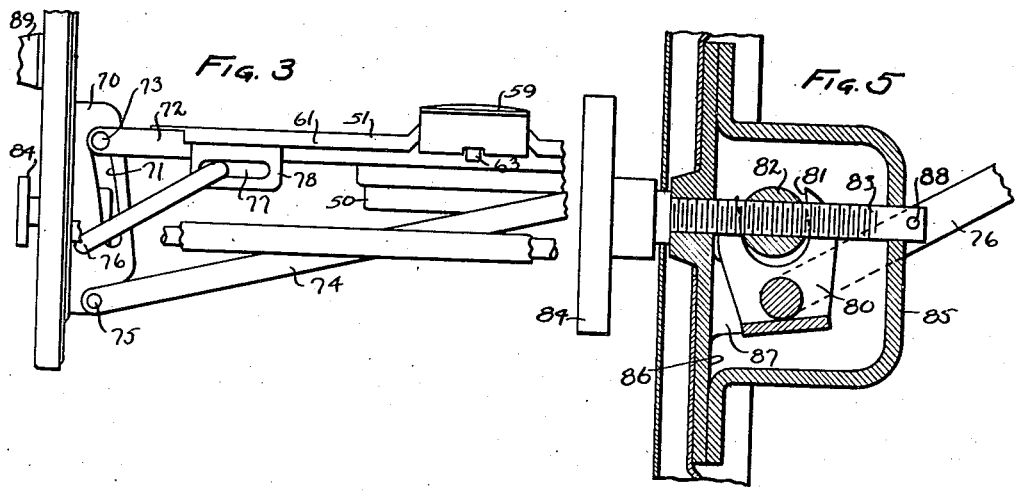
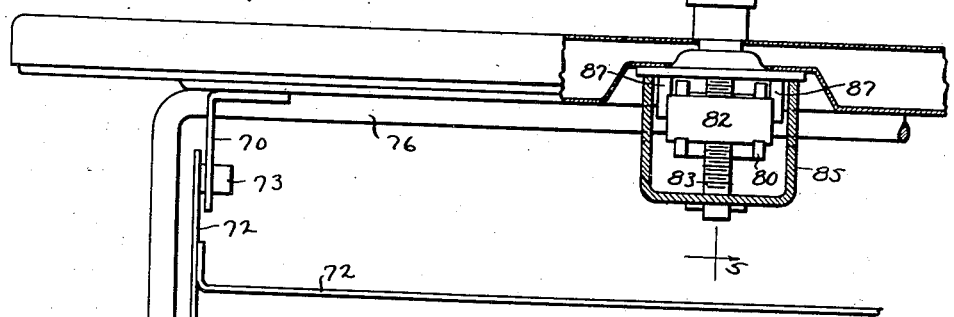
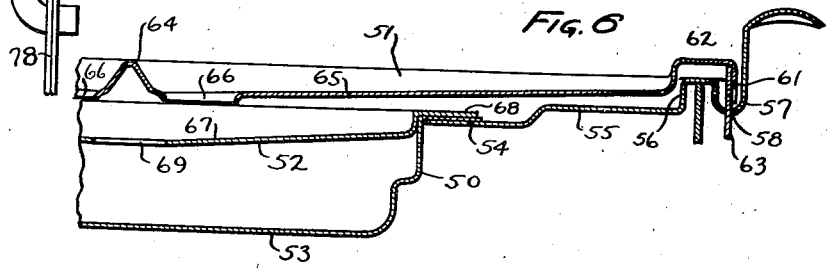
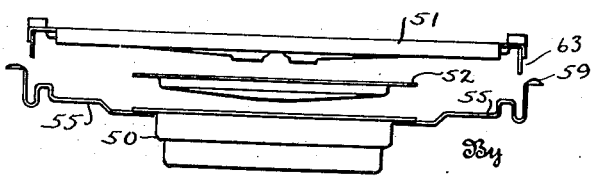
Inventor
Bertrand B Kahn
By Maréchal & Noe
Attorney Patented Oct. 20, 1936

2,057,780

UNITED STATES PATENT OFFICE 2,057,780

STOVE

Bertrand B. Kahn, Cincinnati, Ohio, assignor to The Estate Stove Company, Hamilton, Ohio, a corporation of Ohio Application March 24, 1933, Serial No. 662,534

10 Claims. (Cl. 126—41)

This invention relates to stoves and more particularly to a broiler construction therefor.

One of the principal objects of the invention is to provide a broiler for a stove having means for supporting a broiler pan at a desired elevation within the broiler compartment and so constructed that the position of the pan with respect to a source of heat can be easily adjusted.

It is a further object to provide such a construction for adjustably supporting the broiler pan within the oven which is very simple and inexpensive to manufacture, which is easily cleaned, and which is strong and rigid.

Other objects and advantages will be apparent from the description, the accompanying drawings, and the appended claims.

In the drawings,—

Fig. 1 is a vertical sectional view of a stove having a broiler compartment and mechanism constructed in accordance with the present invention;

Fig. 2 is a plan view of the broiler mechanism with certain parts being broken away to more clearly show the construction thereof;

Fig. 3 is an elevational view of a slightly modified construction;

Fig. 4 is a broken plan view of this modified construction, certain parts being shown in section;

Fig. 5 is a vertical sectional view on the line 5—5 of Fig. 4; and

Fig. 6 is a vertical sectional view through the broiler pan assembly on the line 6—6 of Fig. 2; and Fig. 7 is an elevational view of the broiler pan assembly with the sections separated.

Referring to the drawings which illustrate a preferred embodiment of the invention, there is shown a fragmentary portion of a stove, comprising a broiler compartment which is defined by a top wall 10, a front wall 11, a rear wall 12, a bottom wall 13, the walls being of suitable heat insulating characteristics as desired. A suitable source of heat 14 is positioned within the compartment.

A closure 15 preferably made of double wall construction and with heat insulating material inside thereof is provided for closing the broiler compartment. This closure is supported by a pair of rods 16 fastened to the closure member by means of suitable nuts 17 positioned within the space between the double walls of the closure. These rods extend longitudinally along the sides of the broiler compartment and are enclosed within tubular guides 18 which provide guiding and supporting means therefor, being suitably attached to the walls of the broiler compartment as by means of brackets 19. The guides are supported by the rear wall 12 of the compartment and rods 16 extend beyond the walls of the stove for a limited distance. This distance is such that it is less than the width of the flue and associated parts at the back of the stove so that no extra space is required between the stove and the wall near which it stands, but provision is thereby made for a relatively long supporting rod. This provides adequate support for the closure even in its outermost operative position where there is still a substantial engagement of the rod with the tubular guide. A handle 20 positioned on the closure provides for shifting the broiler assembly into and out of the compartment.

In order to prevent accidental withdrawal of the closure beyond a predetermined point at which the broiler pan is substantially entirely removed from the interior of the compartment, a limit pin 21 is threadedly attached to the lower portion of the closure 15. Pin 21 extends through a slot 22 in wall 23 and is provided on its inner end with an enlargement 24 of such size that it will not pass through slot 22. This pin therefore prevents outward longitudinal movement of the closure beyond a predetermined point but provides for complete removal of the closure if desired upon the disengagement of pin 21 from the closure member.

The closure carries means for supporting a broiler pan, which means provides for adjustably positioning the broiler pan at a desired elevation with respect to the heater element. This means comprises a pair of spaced brackets 30 fastened to the inner face of the closure member and each being formed with an upwardly extending slot 31. The slot is so formed as to provide a plurality of depressions 32, the drawings indicating a construction comprising three such depressions spaced from each other vertically and therefore located at different elevations.

A pan supporting frame comprising sides 33 and ends 34, preferably formed of sheet metal sections, is adapted to be adjustably positioned within the compartment. The side pieces 33 each carry a forwardly extending projection 35 which is provided with a lug 36 extending into the slot 31 and constructed to seat within one of the several depressions 32 to form a support for this, the outer end of the frame. The inner end of the frame is supported by means of arms 37 pivoted to the frame at a point 38 spaced from the projections 35, and to the closure by attachment to the lower portion of the bracket at 39. These arms are greater in length than the distance from the pivots 38 to lugs 36 so that the arc about which pivots 38 swing from points 39 is of greater radius than that of pivots 38 from lugs 36. Therefore since lugs 36 prevent longitudinal movement of the frame inwardly of the broiler in each of the lug positions, the inner end of the frame is prevented from swinging downwardly on the arc of arms 37, and so remains at a fixed elevation. However an upward swinging movement is permissible, the lugs moving to the opposite side of the slot.

The depressions 32 are so arranged that proceeding upwardly each succeeding depression is spaced slightly closer to the front of the stove, this lateral spacing varying substantially in accordance with the projection of arms 37 on a horizontal plane. This insures that there will be a fixed distance between pivots 38 and the depressions 32, so that the frame will uniformly assume a horizontal position at all elevations.

Handles 40 are attached to the side members 33 of the frame and are constructed to extend outwardly and upwardly so that they are easily accessible above the pan when the same is in place and do not interfere with its positioning or removal upon the frame.

When the pan supporting frame is formed of relatively light gage metal parts, it may be found desirable to provide additional means for protecting the frame against misalignment in the slots 31. In such cases a bar 42 is rotatably supported from the closure and passes through suitably formed slots 43 in brackets 30, and is then formed with a right angularly extending portion 44. The pan supporting frame is provided with a depending bracket 45, which, if desired, may be formed integrally with handle 40, and this bracket is provided with an elongated longitudinally extending slot 46. The arms 44 of the bar are adapted to extend within the slot 46 on each side of the frame wherein they ride freely and serve to maintain both sides of the frame at the same elevation. It will be understood however that in any case where the frame itself provides sufficient rigidity to insure against such misalignment, the use of this bar or equivalent construction is not necessary.

The pan supporting frame carries a broiler pan which comprises generally two separable sections, a bottom section or cup 50 and a top plate or cover section 51. It may also include an intermediate cover section 52. Section 50 is provided with a centrally located cup shaped member 53 which is relatively deep and smaller in area than the cover. This cup is provided with an annular flange 54 by means of which it is supported from oppositely extending arms 55. The arms 55 are adapted to rest on and be guided by the side portions 33 of the supporting frame and for this purpose each arm is provided with an inverted U-shaped bend 56 overlying the frame. An oppositely opening bend 57 on the outside of the frame is formed for receiving cooperating portions of cover 51, a slot being provided at the base of this bend as shown at 58. The arms terminate in upwardly and outwardly extending handles 59.

The cover 51, substantially rectangular in outline, is provided with a raised rim 60 and a depending flange 61 which overhangs the sections 33 and 34 of the frame and thereby maintains the cover in proper position upon the frame. The cover is upwardly offset as shown at 62 where it overlies the arms 55 of the cup member and an auxiliary locating member 63 is fastened to the side flange at this point and is adapted to extend through slot 58 to thereby insure the proper positioning of the two pan sections upon the frame, and also to prevent sliding of the cover upon the lower pan section when the broiler pan assembly is removed from the oven.

The cover is provided with raised ribs 64 extending in substantially a plane surface above a bottom portion 65 which slopes toward the center of the pan and into communication with a plurality of passages 66 formed therein.

It will be evident therefore that the material being cooked upon the pan will be maintained in proper relationship with respect to the heating element and that any juice, fat or the like escaping therefrom will flow downwardly through passages 66 and into the cup 50, thereby being removed from the zone of highest heat. Such juices are collected in the cup 50, where because of its depth and protecting cover they are adequately protected against excessive heat and do not burn or produce objectionable smoking.

If desired an intermediate cover member 52 may likewise be provided. This member comprises a circular dished portion 67 adapted to seat within the cup 53, and an annular supporting flange 68 adapted to overlie the flange 54 of the cup. A central aperture 69 is formed through which the juices falling from the top cover member are discharged into the cup 53. This hole 69 is preferably located in such a manner that it is not in direct alignment with the passages 66 so that direct radiation of heat from the heating element down into the cup is prevented. This intermediate member 52 therefore serves as an auxiliary shield, further preventing access of heat into the juices and the like collected within the cup and thereby further insuring against burning or smoking thereof. A further useful function of this member is to prevent the spilling of the collected juices from the cup upon the removal of the pan from the oven or similar movement thereof. The intermediate cover member has a frictional engagement with the cup so that it is retained in position during movement of the cup but can be easily removed therefrom when desired.

The operation of the device is as follows. The closure is first withdrawn to the open position in which practically the entire broiler pan assembly may be exposed and easily accessible to the operator. If it is desired to change the elevation of the pan from its uppermost position to the lower the handles are grasped and the inner end of the frame given a slight upwardly swinging movement, whereupon the lugs 36 will be shifted longitudinally outward and can be dropped to a lower depression 32. Upon the release of handles 40, the inner end of the frame falls to a horizontal position so that this desired horizontal alignment is maintained throughout regardless of the elevation of the pan within the compartment. Similarly if it is desired to raise the pan, the inner end of the frame is given a slight upward swinging movement to disengage the lugs from the lower depressions, and the entire frame is then raised to the desired point. When this is reached, the lugs are allowed to seat in the proper depression and the frame assumes a horizontal position at this elevation. Bar 42 insures against possible distortion of the frame at all times.

Following the broiling operation, the juices, fat and the like will have collected within cup 50, where they are protected against any burning such as might be caused were they spread out thinly over a wide surface and subjected to high heat. The entire broiler pan can be readily removed from the frame and from the broiler compartment by grasping handles 59 and lifting the pan from the frame. This carries not only the cup member but also the cover member upon which the food is placed, the cover being held in place upon the lower member through cooperating parts 58—63. The food is then removed and the cover also removed from the cup member 50. If desired the gravy may be then made directly in the cup member by the addition of the desired ingredients, the cup being placed over a cooking top. In this way it is not necessary to remove the juices from the cup and the operation of making gravy or the like is greatly simplified.

A somewhat modified embodiment of the invention is shown in Figs. 3 to 5 wherein means are provided for adjusting the position of the broiler pan from the exterior of the oven. In this arrangement the brackets 70 are provided with slots 71 having curved sides as indicated, and sloping upwardly toward the front, generally similar to slots 31. The pan supporting frame 72 is provided with lugs 73 adapted to slide within slots 71. The inner end of the frame 72 is pivotally supported upon arms 74 which in turn are pivoted at 75 to brackets 70. A bar 76 passes through the two brackets 70 and engages a slot 77 formed in a depending bracket 78 upon each side of the frame 72.

Means are provided for turning bar 76 to thereby raise and lower the pan supporting frame. This means comprises a U-shaped yoke 80 attached to bar 76 in any suitable manner, the arms of which are provided with semi-circular slots 81 which are adapted to engage a traveling nut 82. This nut is internally threaded and mounted upon a shaft 83. Shaft 83 extends through the face of the closure member where it is provided with an operating handle 84, and is supported upon its inner end by a cap 85, suitably attached to a plate 86 upon the inner face of the closure member. This plate 86 is formed with spaced outstanding projections 87 which are provided with a semicircular slot to receive and form a support for the bar 76. Cap 85 is likewise formed with a cooperating slot opening in the opposite direction to that in projections 87 so that the two sides of cap 85 in assembled relation with projections 87, serve to additionally guide and support the bar 76 in its desired position. A suitable pin 88 prevents axial movement of the shaft 83. Handle 84 may be used to move the broiler into and out of the oven as well as to adjust its elevation, or it may serve only the latter purpose and a separate handle 89 may be provided for the former purpose.

The operation of this mechanism is as follows. With the pan in the position shown in Fig. 3, and assuming that it is desired to lower the pan, the handle 84 is turned in such a manner as to cause the nut 82 to travel inwardly away from the closure member. This produces a swinging movement of the bar 76 about its axis, causing a downward swinging movement of its extending side arms where they are positioned in slots 77. This in turn effects a lowering of the outer end of the pan supporting frame 72, and, by reason of the fact that lugs 73 are required to travel in the path of slot 71, the inner end of the frame is likewise lowered and horizontal position is maintained as discussed more in detail above. Conversely when it is desired to raise the pan, the handle 84 is rotated in the opposite direction with a resultant upward swinging movement of the bar and an upward horizontal elevation of the pan. The bar 76 serves the dual purpose of raising and lowering an end of the frame and of maintaining proper alignment thereof.

The present invention therefore provides a construction free of all complicated mechanism for adjustably positioning a broiler pan within a broiler compartment, either through the manual lifting of the pan or from the exterior of the oven by the simple operation of a turning handle. It provides likewise for removing the broiler pan at will, prevents accidental withdrawal of the pan assembly but provides for complete removal if desired, is so constructed that it is easy to clean and can be constructed throughout of inexpensive sheet metal parts. Further it provides for collecting and preserving the juices that are withdrawn from the material being cooked so that they will not become burned; and furthermore provides a distinct utility in that the same collecting device is designed to serve directly as a cooking element itself within which the making of gravy or similar operation can be performed upon a cooking top.

While the forms of apparatus herein described constitute preferred embodiments of the invention, it is to be understood that the invention is not limited to these precise forms of apparatus, and that changes may be made therein without departing from the scope of the invention which is defined in the appended claims

What is claimed is:

1. In a stove of the character described having a broiler compartment, the combination of a closure for the compartment, a broiler pan supporting frame provided with portions extending from one end thereof, means on said closure effective at varying elevations of said frame for preventing longitudinal movement of said portions away from said closure, arms pivotally attached to said frame at a point spaced from said movement preventing means and also attached to said closure, and means carried by said closure for adjustably supporting said one end of said frame at a desired elevation, said arms providing for the support of the opposite end of the frame at a corresponding elevation.

2. In a stove of the character described having a broiler compartment, a closure for the compartment, a broiler pan supporting frame provided with projections adjacent one end thereof, brackets on said closure, said brackets having upwardly extending slots therein adapted to receive said projections, arms pivotally attached to said frame at a point spaced from said projections and also to said closure, the length of said arms being greater than the length of said frame from the point of attachment of said arms to the point of engagement with said bracket, and means for supporting said one end of said frame at a desired elevation.

3. In a stove of the character described having a broiler compartment, a closure for the compartment, a broiler pan supporting frame provided with projections adjacent one end thereof, means on said closure for slidably receiving said projections and restricting horizontal movement thereof, arms pivotally attached to said frame at points spaced from said projections and also attached to said closure means for supporting the front end of said frame at a desired elevation, and means for maintaining said projections at the same relative position throughout said sliding movement.

4. In a stove of the character described and having a broiler compartment, the combination of a broiler pan supporting frame, a closure for the compartment and means for supporting said frame within the broiler compartment at a variable elevation therein comprising brackets positioned on said closure, projections on said frame adapted to engage said brackets at varying elevations for supporting an end of the frame, arms attached to said frame and to said closure for adjustably supporting another end of the frame, and means pivotally supported from said closure and adapted to engage said frame adjacent the sides thereof to cause substantially simultaneous movement of said projections.

5. In a stove of the character described and having a broiler compartment, the combination of a closure for the compartment, a broiler pan supporting frame having projections extending therefrom, brackets on said closure adjustably engaging said projections, arms attached to said frame and to said closure at points spaced from said brackets for supporting the remote end of the frame at a predetermined elevation corresponding to the position of said projections, said brackets and said arms serving to guide and support said frame at a desired elevation in substantially horizontal position, and means extending to the outside of the compartment and operable for adjusting the position of said projections in said brackets to adjust the elevation of said pan supporting frame.

6. In a stove of the character described and having a broiler compartment, the combination of a closure for the compartment, a broiler pan supporting frame, means adjacent one end of said frame to limit longitudinal movement thereof and for supporting an end of said frame at a desired elevation, means spaced from said first mentioned means for pivotally supporting the end of the frame removed from said first mentioned end at a corresponding elevation, both said means being carried by said closure and providing for raising and lowering of said frame while maintaining substantial horizontal position thereof.

7. In a stove of the character described and having a broiler compartment, a closure for the compartment, and means for adjustably supporting a broiler pan within said compartment entirely from said closure comprising a broiler pan supporting frame, means associated with said closure for limiting longitudinal movement of said frame, arms pivotally associated with said closure and with said frame at points removed from the front end of said frame, and means for supporting the front end of said frame at a desired elevation, said motion limiting means and said arms serving to insure substantially horizontal position of said frame at all elevations.

8. In a stove of the character described and having a broiler compartment, the combination of a broiler pan supporting frame, and a broiler pan comprising a cup member relatively small in area, a pair of relatively narrow arms for supporting said cup member on said frame, and a cover plate member substantially greater in area than said cup overlying said frame, said arms extending beyond said cover member on opposite sides and providing for ready removal of said members from said frame, said cover plate member being formed with a passageway whereby juices and the like collecting on said cover member are discharged into said cup member where they are not exposed to the zone of highest heat.

9. In a stove of the character described and having a broiler compartment, the combination of a broiler pan supporting frame, a broiler pan comprising a cup member adapted to be supported on said frame, a separable cover plate member overlying said cup and likewise supported on said frame, said cover member being formed with a passage for discharging juice and the like into said cup member, cooperating parts on said frame and said cover member for centering said cover member on said frame, and cooperating parts on said members whereby said cover member is adapted to hold said cup member in proper position on said frame underlying said passage, said cup member being adapted to be separated from said cover member and be placed directly over a cooking top.

10. In a stove of the character described and having a broiler compartment, the combination of a broiler pan supporting frame, and a broiler pan comprising a cup member relatively small in area supported on said frame, an impervious cover plate member substantially greater in area than said cup overlying said cup member for collecting meat juices and the like and formed with a discharge passageway for such juice and the like, an intermediate cover member positioned between said cover plate member and said cup member and having a passageway in nonalignment with the passageway in said cover plate member whereby direct radiation of heat to the material in said cup member is prevented.

BERTRAND B. KAHN.